US008915076B2

(12) United States Patent
Xie et al.

(10) Patent No.: US 8,915,076 B2
(45) Date of Patent: Dec. 23, 2014

(54) TRANSMISSION HYDRAULIC CONTROL SYSTEM HAVING FLOW AUGMENTATION

(75) Inventors: Zhe Xie, Rochester, MI (US); Hong Yang, Rochester Hills, MI (US); Anthony L. Smith, Troy, MI (US); James M. Hart, Belleville, MI (US); Steven P. Moorman, Dexter, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 591 days.

(21) Appl. No.: 13/313,871

(22) Filed: Dec. 7, 2011

(65) Prior Publication Data

US 2012/0174570 A1    Jul. 12, 2012

Related U.S. Application Data

(60) Provisional application No. 61/432,140, filed on Jan. 12, 2011.

(51) Int. Cl.
*F16D 31/02* (2006.01)
*F16H 61/00* (2006.01)

(52) U.S. Cl.
CPC .................................. *F16H 61/0031* (2013.01)
USPC ..................... 60/422; 60/420; 60/430; 60/456

(58) Field of Classification Search
CPC .................................................. F16H 61/0031
USPC ........... 60/441, 396, 422, 428, 435, 421, 430, 60/456; 476/8, 9; 137/511
See application file for complete search history.

(56) References Cited

U.S. PATENT DOCUMENTS

| | | |
|---|---|---|
| 4,653,352 A | 3/1987 | Nakao et al. |
| 4,944,202 A | 7/1990 | Gierer |
| 5,441,459 A | 8/1995 | Inukai et al. |
| 6,361,287 B1 | 3/2002 | Hopper |
| 6,715,597 B1 | 4/2004 | Buchanan et al. |
| 7,163,481 B2 | 1/2007 | Takagi et al. |
| 7,300,375 B2 | 11/2007 | Petrzik |
| 7,487,866 B2 | 2/2009 | Kruse et al. |
| 2001/0036878 A1 | 11/2001 | Itou et al. |
| 2002/0060113 A1 | 5/2002 | Harries |
| 2002/0119864 A1 | 8/2002 | Harries |
| 2003/0075408 A1 | 4/2003 | Alfredsson |
| 2004/0038765 A1 | 2/2004 | Fujimine et al. |
| 2007/0175726 A1 | 8/2007 | Combes et al. |
| 2007/0240919 A1* | 10/2007 | Carlson ........................ 180/53.4 |
| 2008/0182709 A1 | 7/2008 | Hart et al. |

(Continued)

FOREIGN PATENT DOCUMENTS

| | | |
|---|---|---|
| CN | 101705995 A | 5/2010 |
| DE | 2141564 A1 | 2/1973 |

(Continued)

*Primary Examiner* — Ned Landrum
*Assistant Examiner* — Logan Kraft

(57) ABSTRACT

A system for providing pressurized hydraulic fluid includes an engine driven main pump and an electrical motor driven auxiliary pump. The auxiliary pump provides hydraulic fluid at line pressure to shift control subsystems during a vehicle launch while the main pump provides hydraulic fluid to cooler or lubrication subsystems during the vehicle launch. A pressure regulation valve regulates the pressure of the hydraulic fluid from the main pump. Once the main pump reaches a critical speed, the main pump provides hydraulic fluid at line pressure to the hydraulic control system and the auxiliary pump is turned off.

15 Claims, 2 Drawing Sheets

(56) References Cited

U.S. PATENT DOCUMENTS

Figure 1:
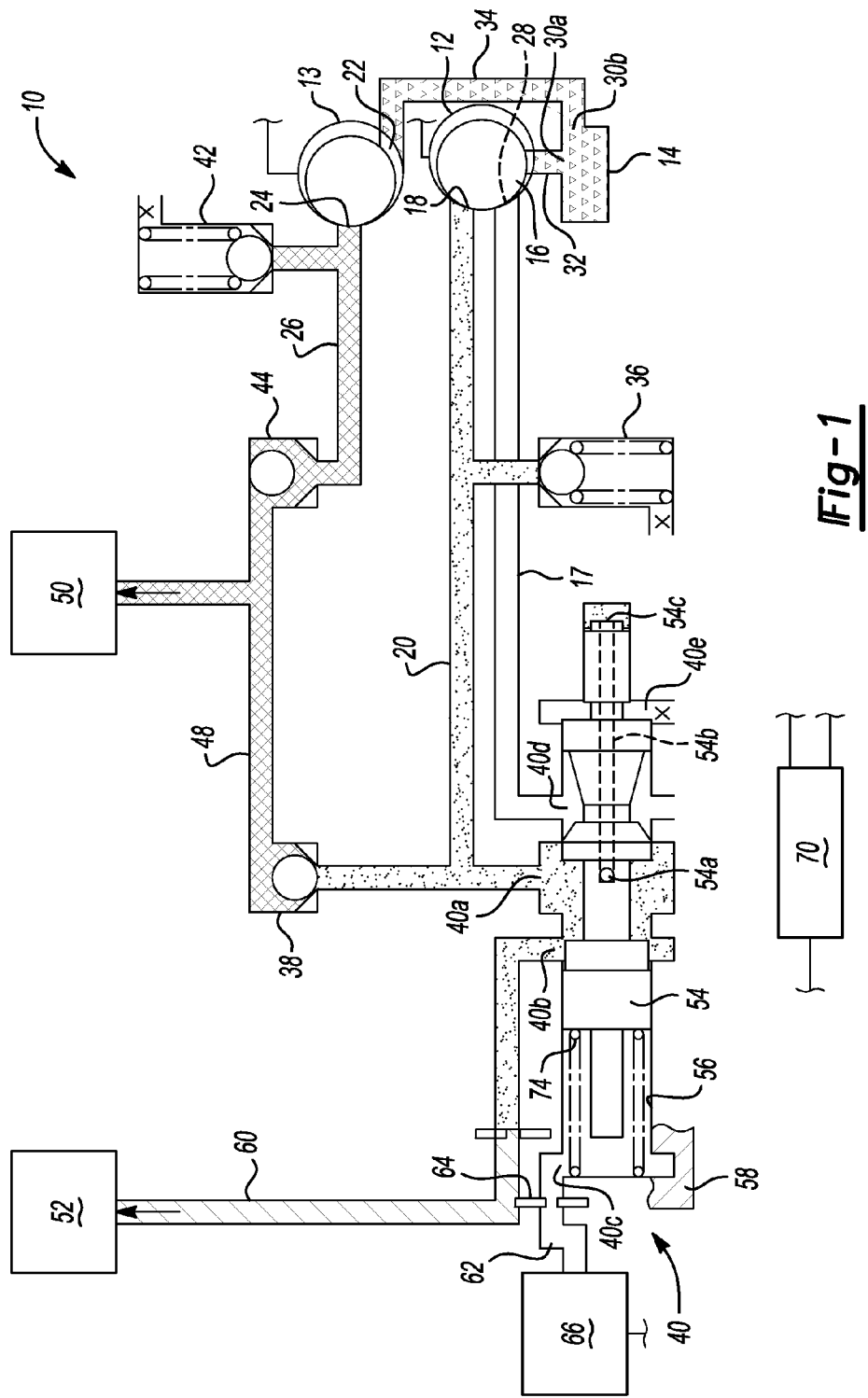

| | | |
|---|---|---|
| 2008/0207392 A1 | 8/2008 | Staudinger et al. |
| 2008/0210032 A1 | 9/2008 | Uberti et al. |
| 2009/0151495 A1 | 6/2009 | Garabello et al. |
| 2009/0157271 A1 | 6/2009 | Garabello et al. |
| 2011/0005617 A1 | 1/2011 | Hart et al. |
| 2012/0103437 A1 | 5/2012 | Hart et al. |

FOREIGN PATENT DOCUMENTS

| | | |
|---|---|---|
| DE | 4117736 C1 | 5/1992 |
| DE | 4320353 A1 | 1/1994 |
| DE | 19637001 A1 | 3/1997 |
| DE | 29714652 U1 | 10/1997 |
| DE | 19813982 A1 | 10/1999 |
| DE | 19921301 A1 | 11/1999 |
| DE | 19849488 A1 | 5/2000 |
| DE | 19857222 A1 | 6/2000 |
| DE | 19931973 A1 | 1/2001 |
| DE | 10147123 A1 | 4/2002 |
| DE | 10134115 A1 | 1/2003 |
| DE | 10243282 A1 | 4/2004 |
| DE | 10327406 A1 | 2/2005 |
| DE | 102004001753 A1 | 8/2005 |
| DE | 102005006431 A1 | 8/2006 |
| DE | 102005029963 A1 | 2/2007 |
| DE | 102005029964 A1 | 3/2007 |
| EP | 0157086 A1 | 10/1985 |
| EP | 0475488 A1 | 3/1992 |
| EP | 0477564 A2 | 4/1992 |
| EP | 0933564 A2 | 8/1999 |
| EP | 1420185 A2 | 5/2004 |
| EP | 1469235 A1 | 10/2004 |
| EP | 1519082 A1 | 3/2005 |
| EP | 1645786 A2 | 4/2006 |
| EP | 2151586 A2 | 2/2010 |
| FR | 2808065 A1 | 10/2001 |
| JP | 58102851 A | 8/1983 |
| JP | 2007010145 A | 1/2007 |
| WO | WO9705410 A1 | 2/1997 |
| WO | WO9919644 A1 | 4/1999 |
| WO | WO2009037170 A1 | 3/2009 |
| WO | WO2010028745 A2 | 3/2010 |

\* cited by examiner

TRANSMISSION HYDRAULIC CONTROL SYSTEM HAVING FLOW AUGMENTATION

CROSS-REFERENCE

This application claims the benefit of U.S. Provisional Application No. 61/432,140, filed Jan. 12, 2011. The entire contents of the above application are incorporated herein by reference.

FIELD

The invention to a hydraulic control system for a transmission, and more particularly to an electro-hydraulic control system having a main pump, an auxiliary pump, and a mechanism to augment pump flow.

BACKGROUND

The statements in this section merely provide background information related to the present invention and may or may not constitute prior art.

A typical automatic transmission includes a hydraulic control system that, among other functions, is employed to actuate a plurality of torque transmitting devices. These torque transmitting devices may be, for example, friction clutches and brakes. The conventional hydraulic control system typically includes a main pump that provides a pressurized fluid, such as oil, to a plurality of valves and solenoids within a valve body. The main pump is driven by the engine or electric motor of the motor vehicle. An auxiliary pump may also be provided powered by a secondary prime mover, such as an electric engine, to provide fluid flow when the prime mover, and therefore the main pump, is turned off such as during stop-start engine control strategies. The valves and solenoids supplied with the hydraulic fluid are operable to direct the pressurized hydraulic fluid through a hydraulic fluid circuit to the plurality of torque transmitting devices within the transmission. The pressurized hydraulic fluid delivered to the torque transmitting devices is used to engage or disengage the devices in order to obtain different gear ratios.

Some transmissions, such as hybrid electrical transmissions, require a high level of torque during launch. However, since the prime mover is off, the main pump is unable to provide the needed hydraulic fluid pressure levels. Accordingly, the auxiliary pump is used to fill the hydraulic circuits during launch. However, there is a constant need to reduce pump sizes in order to reduce cost, packaging size, and efficiency. Therefore, there is a need in the art for a hydraulic control system that augments hydraulic fluid flow while maximizing cost savings, reducing packaging size, and increasing efficiency of the main and auxiliary pumps.

SUMMARY

An example of a system for providing pressurized hydraulic fluid in a transmission of a motor vehicle is provided. The system includes an engine driven main pump and an electrical motor driven auxiliary pump. The auxiliary pump provides hydraulic fluid at line pressure to shift control subsystems during a vehicle launch while the main pump provides hydraulic fluid to cooler or lubrication subsystems during the vehicle launch. A pressure regulation valve regulates the pressure of the hydraulic fluid from the main pump. Once the main pump reaches a critical speed, the main pump provides hydraulic fluid at line pressure to the hydraulic control system and the auxiliary pump is turned off.

Further areas of applicability will become apparent from the description provided herein. It should be understood that the description and specific examples are intended for purposes of illustration only and are not intended to limit the scope of the present invention.

DRAWINGS

The drawings described herein are for illustration purposes only and are not intended to limit the scope of the present invention in any way.

Figure 2:
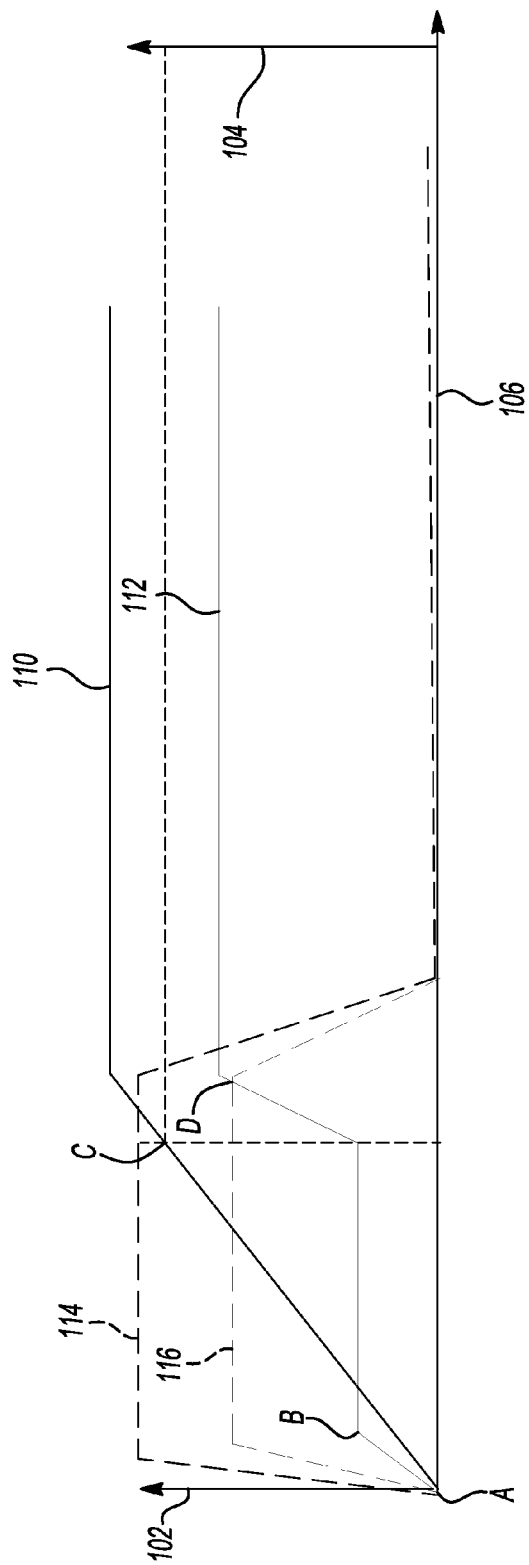

FIG. 1 is a schematic diagram of a subsystem of a hydraulic control system operable to provide pressurized hydraulic fluid flow to the hydraulic control system according to the principles of the present invention; and FIG. 2 is a graph illustrating the operation of the subsystem for providing pressurized hydraulic fluid shown in FIG. 1.

DETAILED DESCRIPTION

The following description is merely exemplary in nature and is not intended to limit the present invention, application, or uses.

Referring to FIG. 1, a subsystem of a hydraulic control system for a transmission of a motor vehicle is generally indicated by reference number 10. The subsystem 10 operates as a source of pressurized hydraulic fluid for the hydraulic control system and includes a main pump 12 and an auxiliary pump 13 in fluid communication with a sump 14. The pump 12 may be directly driven by an internal combustion engine in the motor vehicle or by an electric motor or other prime mover. The pump 12 includes an inlet port 16 and an outlet port 18. The inlet port 16 communicates with the sump 14 and a fluid return line 17 and the outlet port 18 communicates with a low pressure branch or supply line 20. The pump 12 may be of various types, for example, a gear pump, a vane pump, a gerotor pump, or any other positive displacement pump.

The auxiliary pump 13 is driven by an electric motor or other prime mover that is different from the prime mover that drives the pump 12. The auxiliary pump 13 includes an inlet port 22 and an outlet port 24. The inlet port 22 communicates with the sump 14 and the outlet port 24 communicates with a high pressure branch or supply line 26. The auxiliary pump 13 may be of various types, for example, a gear pump, a vane pump, a gerotor pump, or any other positive displacement pump.

The sump 14 is a fluid reservoir, typically located at a bottom of the transmission, which is operable to store a hydraulic fluid 28. The sump 14 includes an outlet port 30 or, as illustrated, two outlet ports 30A and 30B. The hydraulic fluid 28 is forced from the sump 14 by the pump 12 and is communicated from the outlet port 30A of the sump 14 to the inlet port 16 of the pump 12 via a suction line 32. Likewise, the hydraulic fluid 28 is forced from the sump 14 by the auxiliary pump 13 and is communicated from the outlet port 30B of the sump 14 to the inlet port 22 of the auxiliary pump 13 via a suction line 34.

The supply line 20 communicates hydraulic fluid 28 to a first spring biased blow-off safety valve 36, a first one-way check valve 38, and a pressure regulation valve 40. The first spring biased blow-off safety valve 36 communicates with the sump 14. The first spring biased blow-off safety valve 36 is set at a relatively high predetermined pressure and if the pressure of the hydraulic fluid 28 in the supply line 20 exceeds this pressure, the safety valve 36 opens momentarily to relieve and reduce the pressure of the hydraulic fluid 28.

The supply line 26 communicates with a second spring-biased blow-off safety valve 42 and a second one-way check valve 44. The second spring biased blow-off safety valve 42 communicates with the sump 14. The second spring biased blow-off safety valve 42 is set at a relatively high predetermined pressure and if the pressure of the hydraulic fluid 28 in the supply line 26 exceeds this pressure, the safety valve 42 opens momentarily to relieve and reduce the pressure of the hydraulic fluid 28.

The second one-way check valve 44 is in communication with a main supply line 48. The second one-way check valve 44 allows fluid communication in one direction only. For example, the second one-way check valve 44 allows hydraulic fluid communication from the auxiliary pump 13 via the supply line 26 to the main supply line 48 and prevents fluid communication from the main supply line 48 to the supply line 26 and therefore to the auxiliary pump 13.

The main supply line 48 is in communication with the first one-way check valve 38 and various other subsystems or circuits of the hydraulic control system, indicated by reference number 50. The various other subsystems 50 of the hydraulic control system may include, for example, clutch or torque transmitting device control subsystems, compensator subsystems, torque converter control subsystems, etc.

The first one-way check valve 38 allows fluid communication in one direction only. For example, the first one-way check valve 38 allows hydraulic fluid communication from the pump 12 via the supply line 20 to the main supply line 48 and prevents fluid communication from the main supply line 48 to the supply line 20 and therefore to the pump 12.

The pressure regulation valve 40 is operable to regulate the flow of pressurized hydraulic fluid 28 from the supply line 20 to one or more hydraulic control subsystems or circuits, generally indicated by reference number 52. These subsystems 52 include lubrication regulation subsystems and/or cooling subsystems.

The pressure regulation valve 40 includes a spool 54 slidably disposed within a bore 56 of a valve body 58. The pressure regulation valve 40 includes an inlet port 40A, an outlet port 40B, a control port 40C, a pump return port 40D, and an exhaust port 40E that each communicate with the bore 56. It should be appreciated that the pressure regulation valve 40 may have various other ports and configurations without departing from the scope of the present invention. The inlet port 40A is in fluid communication with the supply line 20. The outlet port 40B is in fluid communication with an intermediate line 60 which communicates with the lubrication and/or cooling subsystems 52. The control port 40C is in fluid communication with a control line 62 via a fluid restriction orifice 64. The control line 62 is in communication with a control device 66, such as a solenoid, that controls or regulates a flow of hydraulic fluid to the control port 40C. The pump return port 40D is in fluid communication with the suction return line 17 that communicates with the inlet port 16 of the pump 12. Finally, the exhaust port 40E is in fluid communication with the sump 14 or a sump return circuit (not shown).

The spool 54 is moveable between various positions including a de-stroked or first position, a cracked or second position shown in FIG. 1, a regulated or third position, and a bleed or fourth position. In the example provided, the spool 54 is moved to the de-stroked position by a biasing member or spring 70 located at an end of the spool 54 and when the control device 66 communicates pressurized hydraulic fluid to the control port 40C. However, other methods of biasing the spool 54 may be employed so long as a force acting on the spool 54 moves the spool 54 to a de-stroked position. When the spool 54 is in the de-stroked position, the inlet port 40A is isolated from the outlet port 40B. When the spool 54 is in the cracked position, the inlet port 40A is in partial fluid communication with the outlet port 40B, thereby allowing a flow of hydraulic fluid to exit the output port 40B. When the spool 54 is in the regulated position the inlet port 40A is in regulated fluid communication with the outlet port 40B, resulting in a regulated flow of hydraulic fluid exiting the outlet port 40B. When the valve 150 is in the bleed position, the inlet port 40A is in fluid communication with the outlet port 40B and in partial fluid communication with the pump return port 40D.

A feedback port 54A is located in the spool 54 and is positioned to always be in fluid communication with the inlet port 40A. The feedback port 54A communicates hydraulic fluid through a bore 54B in the spool 54 to an exit port 54C in the end of the spool 54 opposite the end of the spool 54 in contact with the biasing member 74. The feedback port 54A communicates pressurized hydraulic fluid 28 to act on the spool 54, thereby creating a balance of forces on the spool 54 and adjusting the position of the spool 54 automatically between the regulated position and the bleed position in order to maintain a predetermined regulated pressurization of hydraulic fluid from the outlet port 40B. It should be appreciated that the feedback fluid communication between the hydraulic fluid 28 and the end of the spool 54 may be placed outside the spool 54 in other parts of the transmission without departing from the scope of the present invention.

Finally, a controller 70 is provided in electronic communication with the control device 66 as well as the pumps 12 and 13. The controller 70 may be a transmission control module, an engine control module, or both, or any other type of controller or computer. The controller 70 is preferably an electronic control device having a preprogrammed digital computer or processor, control logic, memory used to store data, and at least one I/O peripheral. The controller 70 includes control logic for controlling the control device 66 and the pumps 12 and 13.

The components of the hydraulic control subsystem 10 are connected via a plurality of fluid communication lines, described above. It should be appreciated that the fluid communication lines may be integrated in a valve body or formed from separate tubing or piping without departing from the scope of the present invention. In addition, the fluid communication lines may have any cross sectional shape and may include additional or fewer bends, turns, and branches than illustrated without departing from the scope of the present invention.

Turning to FIG. 2 and with continued reference to FIG. 1, the operation of the hydraulic control subsystem 10 will now be described. FIG. 2 is a graph matching the pressure of the hydraulic fluid 28 on the vertical axis 102 to the speed of the pumps 12 and 13 on the vertical axis 104 over time located on the horizontal axis 106. The relative operating speed of the pump 12 over time is indicated by line 110. The relative pressure of the hydraulic fluid 28 exiting the pump 12 over time is indicated by line 112. The relative operating speed of the auxiliary pump 13 over time is indicated by line 114. The relative pressure of the hydraulic fluid 28 exiting the auxiliary pump 13 over time is indicated by line 116.

At time zero, indicated at point "A", the motor vehicle is in a launch condition. The launch condition may be a cold start, a stop-start, or any other operating condition where the engine of the motor vehicle, and therefore the pump 12, start at zero operating speed. At launch, both the engine and the electric motor are engaged, thereby spinning up the pumps 12 and 13. However, since the electric motor reaches peak torque very quickly, the auxiliary pump 13 reaches top operating speed faster than the pump 12. Line pressure hydraulic fluid 28 is therefore communicated from the auxiliary pump 13, through supply line 26, through the second one-way check valve 44 to the main supply line 48. Since the pressure within the main supply line 48 is greater than the pressure of the hydraulic fluid within the supply line 20 from the pump 12, the first one-way check valve 38 seats. Therefore, the auxiliary pump 13 provides the line pressure hydraulic fluid to the hydraulic control subsystems 50 that require line pressure hydraulic fluid 28 in order to quickly and smoothly launch the motor vehicle.

In order to prevent the check valve 38 from unseating, the pressure regulation valve 40 moves to the cracked position and begins to bleed off the pressure of the hydraulic fluid 28 from the pump 12, shown at point "B", as the pump speed 12 continues to increase. This bleed off pressure is directed to the lubrication and control subsystems 52, which requires lower pressure than the main supply line 48, thus is suitable to be supplied by the engine driven pump 12 operating at a lower speed. The two different pressure levels enable the engine driven pump 12 to operate at a lower pressure since the pump 12 is not supplying hydraulic fluid to the higher pressure main line, which reduces the engine accessory load that is driving the engine driven pump 12 and therefore reduces fuel consumption. The pressure regulation valve 40 maintains a constant pressure of the hydraulic fluid even as the pump speed 12 increases.

At a predetermined critical speed of the pump 12, indicated at point "C", the speed of the auxiliary pump 13 is maintained while the pressure regulation valve 40 allows the pressure of the hydraulic fluid 28 from the pump 12 to increase (i.e., the pressure regulation valve 40 moves to the de-stroked position). As the pressure within the supply line 20 exceeds the pressure within the main supply line 48, indicated at point "D", the first check valve 38 unseats and the pump 12 provides hydraulic fluid 28 at line pressure. At that point the auxiliary pump is turned off and the second check valve 44 seats to prevent fluid backflow into the auxiliary pump 13. The pressure regulation valve 40 then regulates the pressure of the hydraulic fluid 28 at line pressure, while the auxiliary pump 13 remains off.

The description of the invention is merely exemplary in nature and variations that do not depart from the gist of the invention are intended to be within the scope of the invention. Such variations are not to be regarded as a departure from the spirit and scope of the invention.

The following is claimed:

1. A hydraulic control system for a transmission in a motor vehicle, the hydraulic control system comprising:
   an engine driven pump for providing a first supply of hydraulic fluid;
   an electric motor driven pump for providing a second supply of hydraulic fluid;
   a first one-way valve disposed in downstream fluid communication with the engine driven pump and configured to allow the first supply of hydraulic fluid to flow from the engine driven pump through the first one-way valve;
   a second one-way valve disposed in downstream fluid communication with the electric motor driven pump and configured to allow the second supply of hydraulic fluid to flow from the electric motor driven pump through the second one-way valve;
   a clutch control circuit disposed in downstream fluid communication with both the first and second one-way valves;
   a pressure regulator valve disposed in downstream fluid communication with the engine driven pump, wherein the pressure regulator valve is moveable between a first position and a second position; and
   a lubrication control circuit disposed in downstream fluid communication with the pressure regulator valve,
   wherein the pressure regulator valve allows fluid communication from the engine driven pump to the lubrication control circuit when in the first position and wherein the pressure regulator valve prohibits fluid communication from the engine driven pump to the lubrication control circuit when in the second position, and
   wherein the engine driven pump and the electric motor driven pump are operated simultaneously so that the first supply of hydraulic fluid supplies the lubrication control circuit and the second supply of hydraulic fluid supplies the clutch control circuit.

2. The hydraulic control system of claim 1 wherein the electric motor driven pump is operated when the engine driven pump is operating below the threshold speed and wherein the electric motor driven pump is disengaged when the first supply of hydraulic fluid is at or above a threshold pressure.

3. The hydraulic control system of claim 2 wherein the threshold pressure is the pressure of the first supply of hydraulic fluid sufficient to close the second one-way valve.

4. The hydraulic control system of claim 1 wherein the pressure regulator valve is moved between the first and second positions by a solenoid and a biasing member.

5. The hydraulic control system of claim 1 wherein the engine driven pump includes an inlet and an outlet, and the pressure regulator valve is in upstream fluid communication with the inlet of the engine driven pump and wherein the pressure regulator valve allows fluid communication between the inlet of the engine driven pump and the outlet of the engine driven pump when the pressure regulator valve is in a third position.

6. A hydraulic control system for a transmission in a motor vehicle, the hydraulic control system comprising:
   an engine driven pump having an outlet for supplying a first hydraulic fluid;
   an electric motor driven pump having an outlet for supplying a second hydraulic fluid;
   a first one-way valve disposed in downstream fluid communication with the outlet of the engine driven pump and configured to allow the first hydraulic fluid to flow from the engine driven pump through the first one-way valve;
   a second one-way valve disposed in downstream fluid communication with the outlet of the electric motor driven pump and configured to allow the second hydraulic fluid to flow from the electric motor driven pump through the second one-way valve;
   a clutch control circuit disposed in downstream fluid communication with both the first and second one-way valves;
   a pressure regulator having an inlet in downstream fluid communication with the outlet of the engine driven pump, a first outlet, and a spool moveable between a first position and a second position, wherein the spool allows fluid communication between the inlet and the first outlet when in the first position and wherein the spool prevents fluid communication between the inlet and the first outlet when in the second position; and
   a lubrication control circuit disposed in downstream fluid communication with the first outlet of the pressure regulator, and
   wherein the spool is in the first position when the engine driven pump is operating below a threshold speed and wherein the spool is in the second position when the engine driven pump is operating at or above the threshold speed.

7. The hydraulic control system of claim 6 wherein the electric motor driven pump is operated when the engine driven pump is operating below the threshold speed and wherein the electric motor driven pump is disengaged when the engine driven pump is operating at or above the threshold speed.

8. The hydraulic control system of claim 6 wherein the threshold speed is the operating speed of the engine driven pump sufficient to provide the first hydraulic fluid to the clutch control circuit at a required pressure level in a predetermined amount of time.

9. The hydraulic control system of claim 6 wherein the spool is moved between the first and second positions by a solenoid and a biasing member.

10. The hydraulic control system of claim 6 wherein the engine driven pump includes an inlet and the pressure regulator includes a second outlet in upstream fluid communication with the inlet of the engine driven pump, and wherein the spool allows fluid communication from the inlet of the pressure regulator to the second outlet of the pressure regulator when the spool is in a third position.

11. The hydraulic control system of claim 10 wherein the spool allows fluid communication from the inlet of the pressure regulator to the first outlet of the pressure regulator when the spool is in the third position.

12. A hydraulic control system for a transmission in a motor vehicle, the hydraulic control system comprising:
    an engine driven pump having an outlet for supplying a first hydraulic fluid;
    an electric motor driven pump having an outlet for supplying a second hydraulic fluid;
    a first one-way valve disposed in downstream fluid communication with the outlet of the engine driven pump and configured to allow the first hydraulic fluid to flow from the engine driven pump through the first one-way valve;
    a second one-way valve disposed in downstream fluid communication with the outlet of the electric motor driven pump and configured to allow the second hydraulic fluid to flow from the electric motor driven pump through the second one-way valve;
    a clutch control circuit disposed in downstream fluid communication with both the first and second one-way valves;
    a pressure regulator having an inlet in downstream fluid communication with the outlet of the engine driven pump, a first outlet, and a spool moveable between a first position and a second position, wherein the spool allows fluid communication between the inlet and the first outlet when in the first position and wherein the spool prevents fluid communication between the inlet and the first outlet when in the second position;
    a lubrication control circuit disposed in downstream fluid communication with the first outlet of the pressure regulator;
    a control device configured to move the spool;
    a controller in electronic communication with the control device, the engine driven pump, and the electric motor driven pump, wherein the controller includes a processor and memory for storing and executing control logic, the control logic including:
        a first control logic for sensing a speed of the engine driven pump;
        a second control logic for sensing a speed of the electric motor driven pump;
        a third control logic for commanding the control device to position the spool in the first position when the engine driven pump is operating below a threshold speed; and
        a third control logic for commanding the control device to position the spool in the second position when the engine driven pump is operating at or above the threshold speed.

13. The hydraulic control system of claim 12 wherein the controller includes a fourth control logic for commanding the electric motor driven pump to operate when the engine driven pump is operating below the threshold speed.

14. The hydraulic control system of claim 13 wherein the controller includes a fifth control logic for commanding the electric motor driven pump to turn off when the engine driven pump is operating at or above the threshold speed.

15. The hydraulic control system of claim 14 wherein the threshold speed is the operating speed of the engine driven pump sufficient to provide the first hydraulic fluid to the clutch control circuit at a required pressure level in a predetermined amount of time.

* * * * *